United States Patent
Kim et al.

(10) Patent No.: US 6,301,622 B1
(45) Date of Patent: Oct. 9, 2001

(54) COMPUTER SYSTEM HAVING IDENTIFICATION DATA AND METHOD FOR TRANSFERRING IDENTIFICATION DATA TO COMPUTER

(75) Inventors: Jae-wook Kim, Suwon; Kil-moo Lee, Seoul, both of (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/207,589

(22) Filed: Dec. 8, 1998

(30) Foreign Application Priority Data

Dec. 8, 1997 (KR) .................................................. 97-66752

(51) Int. Cl.[7] ...................................................... G06F 13/00
(52) U.S. Cl. .............................. 709/250; 709/223; 710/9; 713/2
(58) Field of Search ..................................... 709/220, 222, 709/223, 226, 250; 710/8, 9, 10, 13; 713/1, 2, 100, 201

(56) References Cited

U.S. PATENT DOCUMENTS

| | | |
|---|---|---|
| 4,930,159 | * 5/1990 | Kravitz et al. . |
| 5,132,729 | 7/1992 | Matsushita et al. . |
| 5,473,318 | 12/1995 | Martel . |
| 5,619,724 | * 4/1997 | Moore ...................................... 710/9 |
| 5,764,892 | 6/1998 | Cain et al. . |
| 5,781,407 | * 7/1998 | Brauel ................................... 361/683 |
| 5,787,367 | 7/1998 | Berra . |
| 5,794,007 | * 8/1998 | Arrigotti et al. ................. 395/500.17 |
| 5,802,280 | 9/1998 | Cotichini et al. . |
| 5,946,497 | * 8/1999 | Lee et al. ............................... 712/37 |

FOREIGN PATENT DOCUMENTS

| | | |
|---|---|---|
| 1996/2038 | 1/1996 | (KR) . |
| 10-1997/0066752 | 8/2000 | (KR) . |
| 162365 | 7/1991 | (TW) . |

\* cited by examiner

Primary Examiner—Viet D. Vu
(74) Attorney, Agent, or Firm—Robert E. Bushnell, Esq.

(57) ABSTRACT

A computer system uses a read only memory to store computer identifying data. The computer starts by reading the identification number recorded on a bar code and temporarily storing the data in an auxiliary memory of the computer. Then, the computer system loads the basic input/output services instructions from the read only memory and writes the instructions into the random access memory of the computer. After, the identification number, or data, that is stored in the auxiliary memory is stored in the random access memory. Then, the computer erases the data stored in the read only memory that relates to the basic input/out services. Afterwards, the computer stores both the computer identifying information and the data related to the basic input/output services into the read only memory. The stored computer identification data can also be used to provide an exclusive network address.

12 Claims, 5 Drawing Sheets

COMPUTER SYSTEM HAVING IDENTIFICATION DATA AND METHOD FOR TRANSFERRING IDENTIFICATION DATA TO COMPUTER

CLAIM OF PRIORITY

This application makes reference to, incorporates the same herein, and claims all rights accruing thereto under 35 U.S.C. §119 through my patent application entitled Computer Having Identification Number Storing Function and Method for Storing Identification Number earlier filed in the Korean Industrial Property Office on the 8th day of December 1997 and there duly assigned Serial No. 1997/66752.

BACKGROUND OF THE INVENTION

1. Field of the Invention

The present invention relates to the identification of individual computers and, more specifically, to a device and a method for storing computer identification data in a computer.

2. Background Art

Today, computers use permanent memory to store the software code that provides essential low-level services, commonly called Basic Input/Output Services, some type of storage device to provide access to an operating system that provides higher level services, and some type of storage device that allows a user to run application programs and retrieve stored data. For example, one configuration is for a personal computer to have the Basic Input/Output Services stored in an integrated circuit located on the motherboard, and to provide volatile memory chips, commonly referred to as random access memory, into which programs or parts of programs are retrieved from a secondary storage device for operation.

There are two types of identifying data commonly associated with computers. There is manufacturing data that is used to identify the computer hardware itself and address data that is used to identify a computer to a network or a server. In a networked computer system, each computer has an exclusive means of identifying the computer to the network. In addition, for manufacturing purposes, inventory purposes, and security purposes, computers also have serial numbers attached to facilitate the identification of the computer hardware itself. These serial numbers or manufacturer's label indicate the product name and provide a bar code label that indicates a serial number. Some techniques for using identifying data with computers are shown, for example, in U.S. Pat. No. 5,132,729 to Matsushita entitled Genuine Security Article Distinguishing System for an Image Forming Apparatus, U.S. Pat. No. 5,473,318 to Martel entitled Secure Remote Control System With Receiver Controlled to Add and Delete Identification Codes, U.S. Pat. No. 5,764,892 to Cain entitled Security Apparatus and Method, U.S. Pat. No. 5,802,280 to Cotichini entitled Security Apparatus and Method, and U.S. Pat. No. 5,787,367 to Berea entitled Flash Reprogramming Security for Vehicle Computer.

The need for separate computer hardware identifying numbers and computer network address numbers has resulted in both manufacturers and network providers needing to maintain multiple databases for the separate numbers. However, with today's convergence between manufacturers and network providers, the maintenance of two separate databases and the constant need to generate new numbers results in a waste of time and a lowering of efficiency in networking productivity.

As such, I believe that it may be possible to improve the contemporary art of computer identification by providing a method and a device for storing identifying data in a computer, that can be used to provide an exclusive network address, that safely stores the serial number in read only memory, and that reduces the costs of operating both a manufacturing operation and a computer networking operation.

SUMMARY OF THE INVENTION

Accordingly, it is an object of the present invention to provide a method and a device for storing computer identifying data in a computer.

It is another object to provide a method and a device for storing computer identifying data that can also be used to provide an exclusive network address.

It is still another object to provide a method and a device for storing computer identifying data that safely stores the serial number of a computer in read only memory.

It is yet another object to provide a method and a device for storing computer identifying data that reduces the costs of operating both a manufacturing operation and a computer networking operation.

To achieve these and other objects, a computer system is provided that uses a read only memory to store computer identifying data. Accordingly, the computer system uses a read only memory that has first portion for storing a set of instructions to operate the basic input/output services of the computer and a second portion for storing identification data that is unique to the individual computer.

In addition, the computer system may be constructed using a random access memory, a central processing unit, a read only memory having a first portion and a second portion, an auxiliary memory, and a serial input/output device. Furthermore, the computer system may have an identification number, or serial number, storing function. An attached bar code reader may be used to read the serial number, or other identifying data, from a bar code. Then, an identification number input program stores the data in random access memory. Both of the programs reside in the random access memory and are executed under control of the central processing unit. The data scanned using a bar code reader is then transferred through the serial input/output device, or peripheral port, and stored in a predetermined area of the auxiliary storage, or auxiliary memory, of the computer. An identification number storing program stores the identifying data in a portion of the read only memory. To facilitate the integration of hardware and networking service providers the identifying data used for the individual computer can also be used to specify an exclusive network address.

A method is provided for storing an identification number for a computer in a read only memory that has a portion containing basic input/output services and a portion containing identifying data. The method starts with reading the identification number recorded on a bar code and temporarily storing the data in an auxiliary memory of the computer. Then, the computer system loads the basic input/output services instructions from the read only memory and writes the instructions into the random access memory of the computer. After, the identification number, or data, that is stored in the auxiliary memory is stored in the random access memory. Then, the computer erases the data stored in the read only memory that relates to the basic input/output services. Afterwards, the computer stores both the computer identifying information and the data related to the basic input/output services into the read only memory. The stored computer identification data can also be used to provide an exclusive network address.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
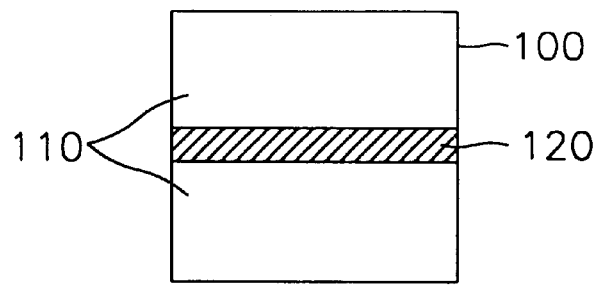
FIG. 1 is a block diagram of a read only memory for storing an identification number in accordance with the principles of the present invention.

Turning now to the drawings, FIG. 1 illustrates read only memory 100 that is used with the computer system of the present invention. Read only memory 100 has first portion 110 that stores instructions for basic input/output services and second portion 120 for storing identification data that is unique to the computer. Read only memory 100 is preferably a flash memory. During the production of the computers, the image of the basic input/out services is written in first portion 110 while nothing is stored in second portion 120 in read only memory 100.

Figure 2:
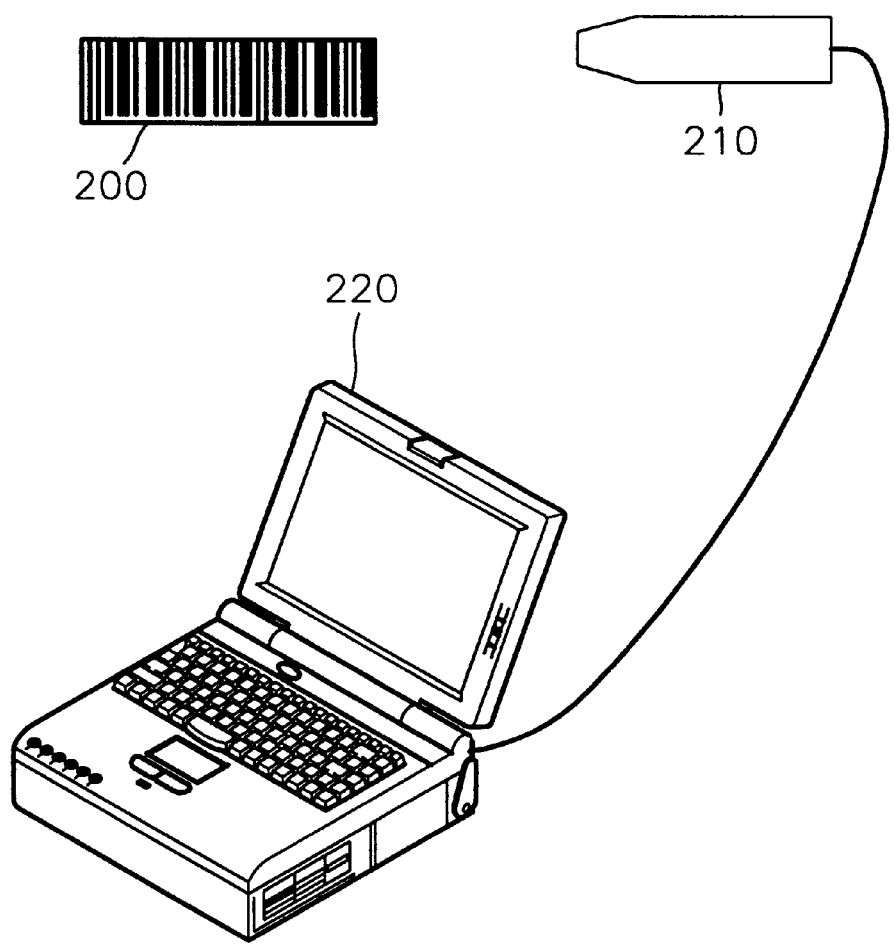
FIG. 2 is a perspective view illustrating a computer system that can store an identification number in a computer using a bar code reader in accordance with the principles of the present invention.

This allows a process for storing the identification number, or data, on each computer during the final stage of production. The identification number for each computer is recorded in bar code 200, as shown in FIG. 2. Bar code 200 is read by bar code reader 210 and the information is stored in read only memory 100 of computer 220.

Figure 3:
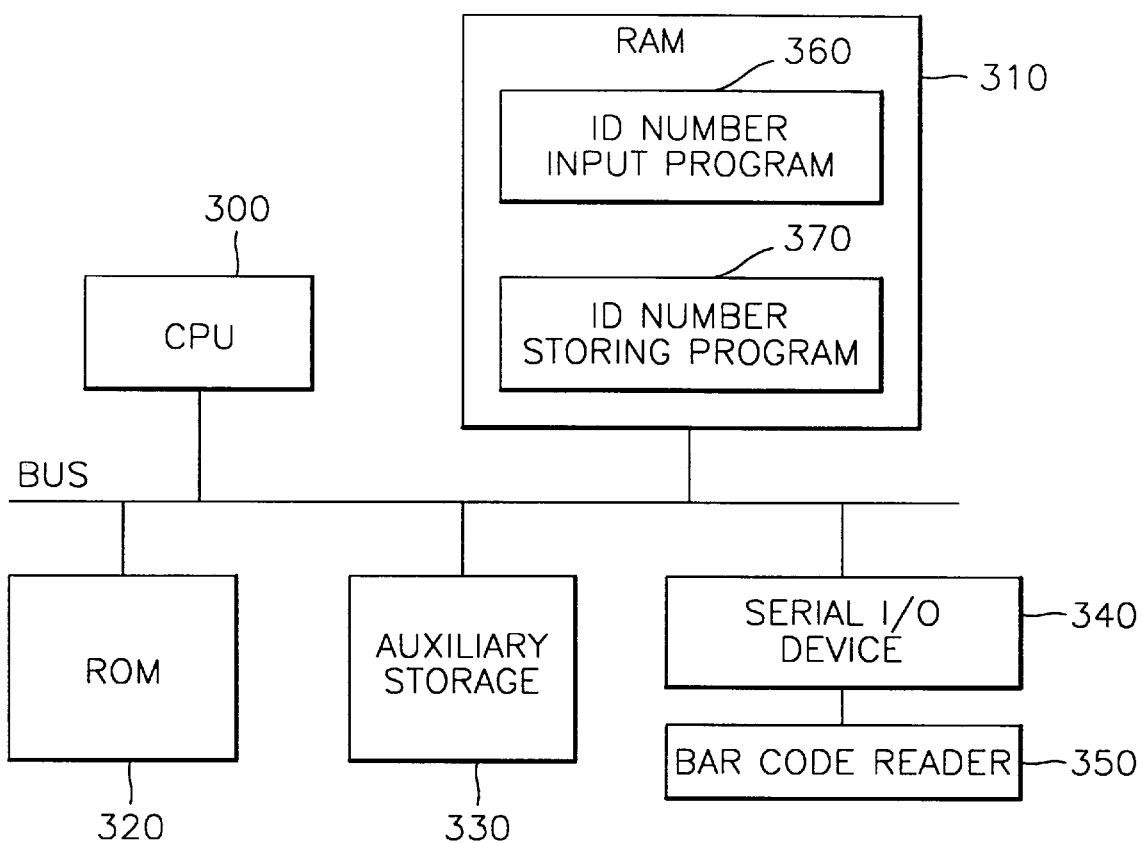
FIG. 3 is a block diagram showing the design of the computer of FIG. 2.

Referring to FIG. 3, a computer having a computer identifying data storing function according to the principles of the present invention may be constructed using central processing unit 300, a random access memory 310, read only memory 320, auxiliary storage, or memory, 330, and a serial input/output device, or peripheral port, 340. The computer may also use software that is stored in random access memory 310. Identification number input program 360 and an identification number storing program 370 are both used by the computer system to manipulate the data read using the bar code reader and to transform it into read only memory data. Read only memory 320 of FIG. 3 is the same read only memory 100 that is shown in FIG. 1. Accordingly, read only memory 320 has a first portion for storing basic input/output services and a second portion for storing computer identifying information.

Bar code reader 350 is connected to serial input/output device 340 of the computer and reads an identification number recorded in a bar code format during the final stages of computer production. Identification number input program 360 and the identification number storing program 370 then store the data in auxiliary storage, or memory, 330. The identification number input program 360 reads the identification number via bar code reader 350 and serial input/output device 340 and stores the identification data in a predetermined area of auxiliary storage 330.

Figure 5:
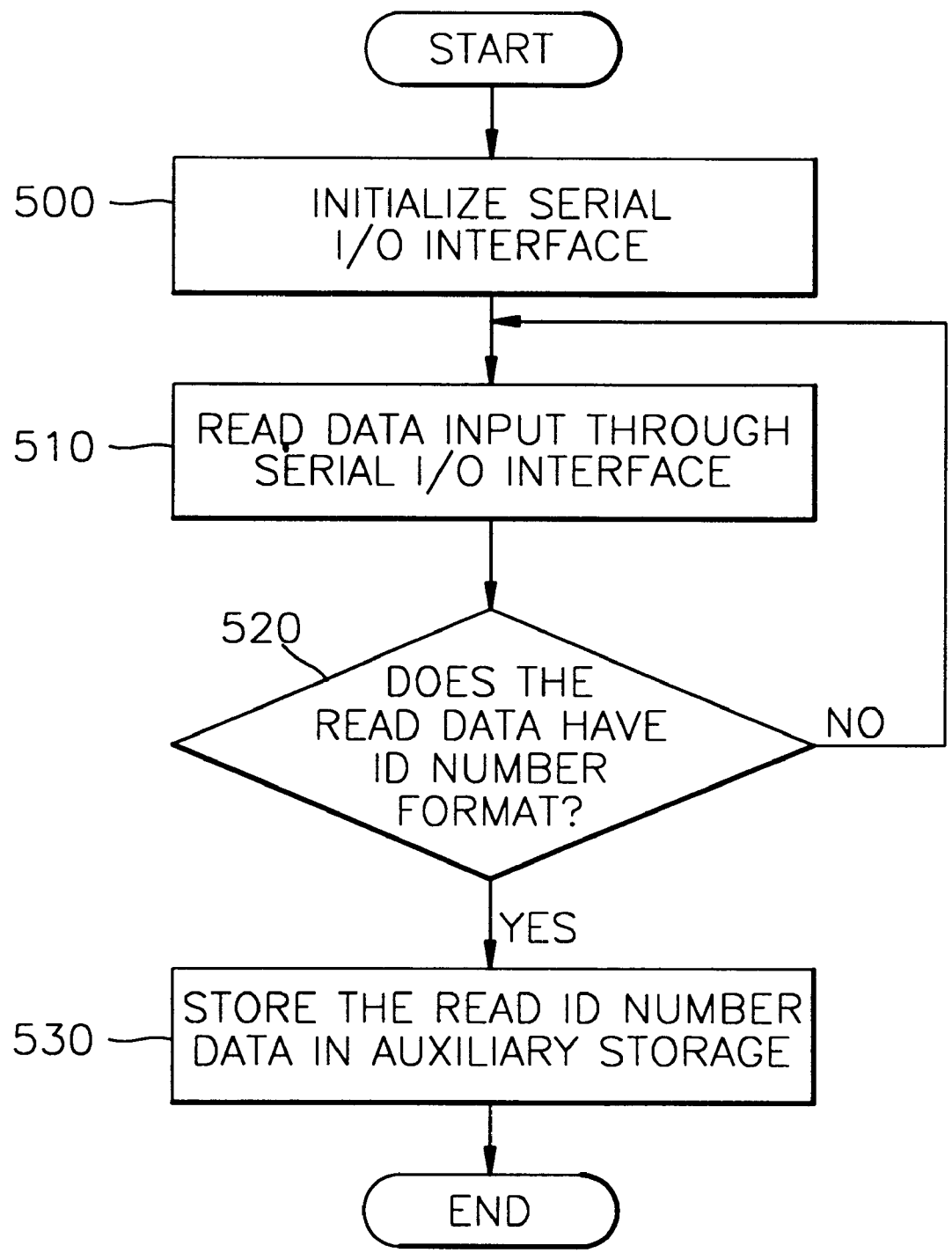
FIG. 5 is a flow chart showing the operation of the identification number input program shown in FIG. 3.

FIG. 5 illustrates the method of reading computer identifying information and storing it in auxiliary memory. First, as shown in step 500, a serial input/output interface for serial input/output device 340 is initialized. Then, during step 510, data is read through the serial input/output interface via the bar code reader. Next, in step 520, the data read in step 510 is checked to determine whether it is in the proper computer identification format. If the data does not have the proper format, the process returns to step 510. Otherwise the read identification number data is stored on the auxiliary storage 330, during step 530. Afterwards, identification number storing program 370 stores the identification data, or number, that is stored in auxiliary storage 330 in the identification number portion, or first portion, 120 of read only memory 100. This number can also be used by the computer system to provide an exclusive network address for the computer.

Figure 4:
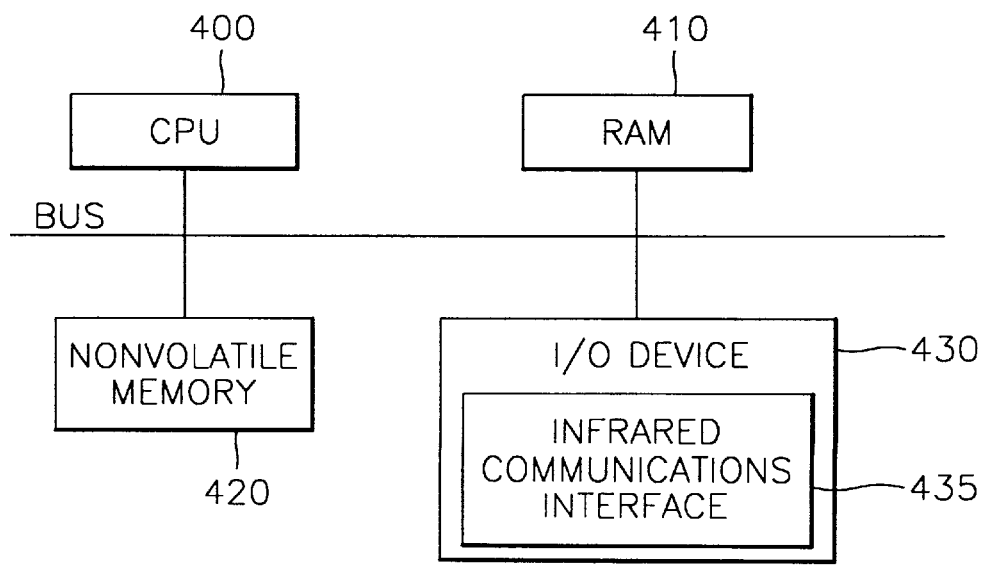
FIG. 4 is a block diagram showing the design of the computer of FIG. 2.

As shown in FIG. 4, a computer having a built-in identification number according to the present invention may be constructed using nonvolatile memory 420 for storing the identification data peculiar to the individual computer. The computer may also use central processing unit 400, random access memory 410, and input/output device 430. When the identification number, or data, is requested by an external system or network, central processing unit 400 reads the identification number from read only nonvolatile memory 420 and outputs the data to the external system or network via input/output device 430.

Preferably, the computer of FIG. 4 may be a notebook computer and input/output device 430 may be infrared communications interface 435. Also, the nonvolatile memory 420 may preferably be a flash memory having both basic input/output services portion, or first portion, 110 and identification data portion, or second portion, 120, as shown in FIG. 1.

Figure 6:
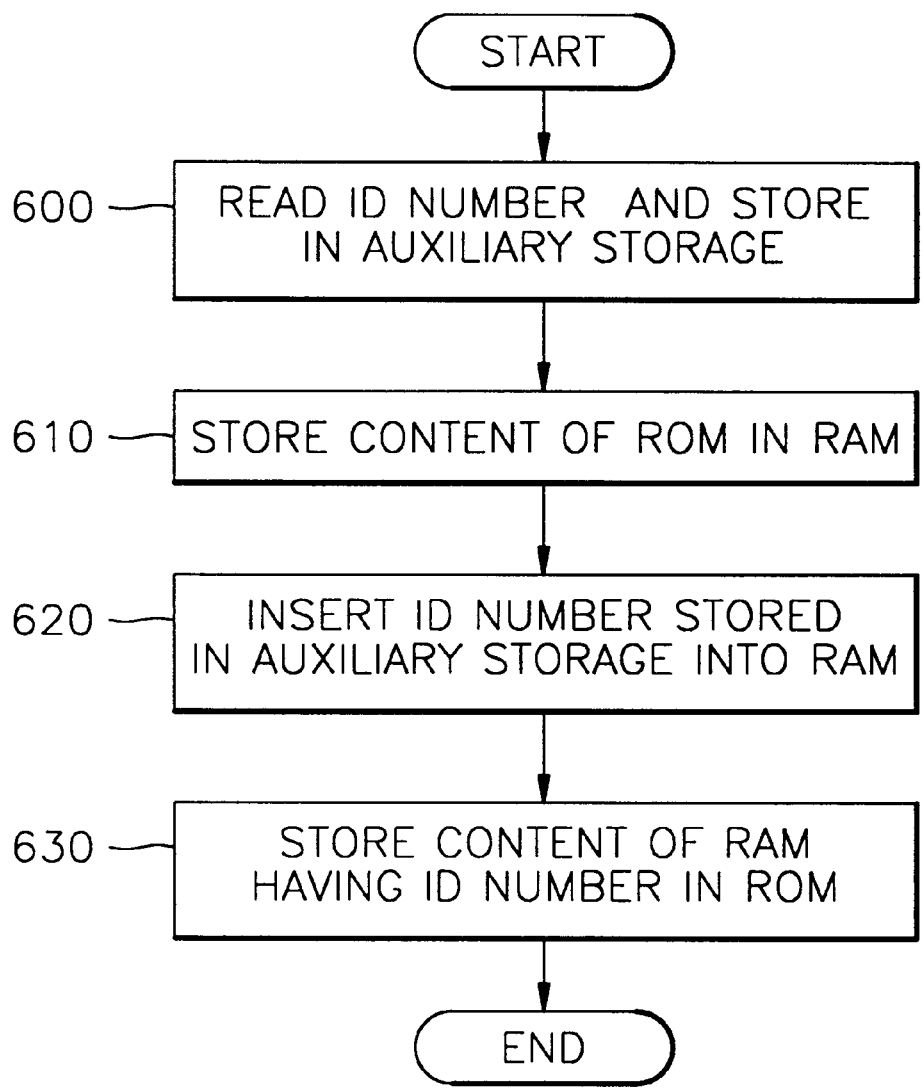
FIG. 6 is a flow chart showing the process of storing the identification number of a computer according to the principles of the present invention.

FIG. 6 illustrates a process for storing the identification number of a computer in read only memory 100. First, the identification data is read from a bar code and temporarily stored in auxiliary memory of the computer, during step 600. The process of step 600 is performed by the identification number input program 360 of FIG. 3, as described above with reference of FIG. 5.

The subsequent processes are performed by the identification number storing program access memory 370 of FIG. 3. The basic input/output services portion and the entire identification number portion are loaded into random access memory, during step 610. Preferably, the flash memory is erasable only in its entirety due to the characteristics of the flash memory. Next, during step 620, the identification data that is temporarily stored in an auxiliary storage is inserted into the identification number portion of the random access memory. Thus, an image of the basic input/output services read only memory including the identification number is formed. Then, the content stored in the read only memory is erased and the basic input/output services read only memory image formed in step 620 is stored in the read only memory, during step 630. Preferably, the erasing and re-storing process of step 630 is performed using the entire image of the read only memory or the image of a block including the identification number portion according to the characteristic of the flash memory.

Figure 7:
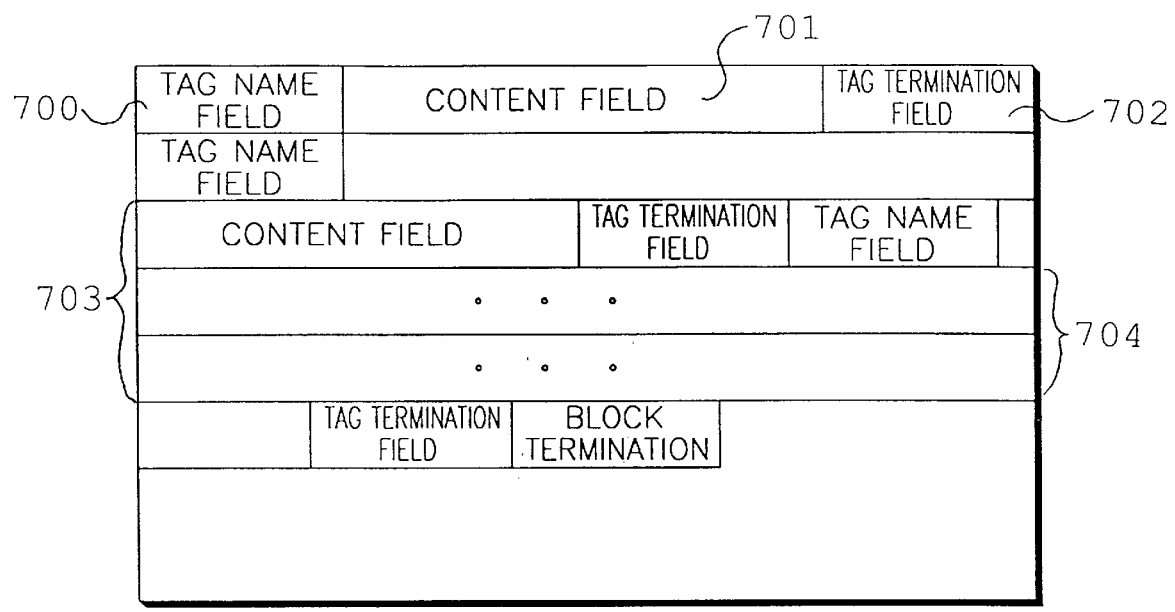
FIG. 7 is a view showing a data structure including history information that can be manipulated by the computer system of the present invention.

As shown in FIG. 7, the identification data portion, or second portion, 120 of FIG. 1 may be designed to store history information of the computer as well as the current identification number. The data structure of the history information may include tag name field 700, a content field 701, and an end tag field 702 to facilitate the continuous addition of data. The structure of the content field is determined by a value stored in the tag name field, e.g., the type of model and the manufacturing date, and a block end field is recorded at the end of history information 703. Thus, newly added history information 702 is added at the end of the conventional history information.

As described above, according to the present invention, the individual identification number stored in the read only memory of a computer can be utilized as a network address. Further, by using the identification number, a lost or stolen computer can be easily identified. Although this preferred embodiment of the present invention has been disclosed for illustrative purposes, those skilled in the art will appreciate that various modifications, additions and substitutions are possible, without departing from read only memory the scope and spirit of the invention as disclosed in the accompanying claims. It is also possible that other benefits or uses of the currently disclosed invention will become apparent over time.

What is claimed is:

1. A computer system, comprising:

a body enclosing a central processing unit;

a random access memory connected to said central processing unit;

a read only memory connected to said central processing unit and having a first portion for storing a plurality of instructions for basic input/output services of said computer system;

an auxiliary memory attached to said central processor unit;

a bar code reader attached to said central processor unit via a peripheral port for reading a plurality of identification data that is displayed as a bar code proximate to said computer system;

an identification data input program, stored in said random access memory and executed under the control of said central processing unit, for reading said plurality of identification data via said bar code reader and storing the plurality of identification data in said auxiliary memory; and an identification data storing program, stored in said random access memory and executed under the control of said central processing unit, for taking said plurality of identification data, that is stored in said auxiliary storage, and storing said plurality of identification data in a second portion of said read only memory.

2. The computer system of claim 1, with said plurality of identification data comprising a serial number unique to said computer system.

3. The computer system of claim 2, with said computer system capable of using said identification number as an exclusive network address to connect said computer system to a network.

4. The computer system of claim 3, with said plurality of identification data further comprising a tag name field, a content field, a tag termination field, and a field for storing past identification information.

5. The computer system of claim 4, further comprised of said computer being a notebook computer.

6. The computer system of claim 5, wherein the peripherl port of said computer is an infrared communications interface.

7. The computer system as claimed in claim 6, wherein said read only memory is a flash memory.

8. A method for storing a plurality of computer identification data, said method comprising the steps of:

reading said plurality of computer identification data from a bar code via a bar code reader attached to a peripheral port of a computer and temporarily storing said plurality of computer identification data in an auxiliary memory of said computer;

loading a plurality of basic input/output services data from a read only memory of said computer system into a random access memory of said computer, said read only memory having a first portion and a second portion;

writing said plurality of computer identification data, contained in said auxiliary memory, into an identification portion of said random access memory;

erasing the plurality of basic input/output services data contained in said read only memory; and storing both said plurality of basic input/output services data and said plurality of computer identification data, that are both contained in said random access memory, into said read only is memory, said plurality of basic input/output services data being stored in said first portion of said read only memory and said plurality of computer identification data being stored in said second portion of said read only memory.

9. The method of claim 8, wherein said read only memory is a flash read only memory.

10. The method of claim 9, wherein said flash read only memory is capable of being erased in segments.

11. The method of claim 10, with said step of loading comprising loading only a segment containing said second portion of said read only memory.

12. The method of claim 11, with said step of of erasing comprising erasing only the content of said segment containing said second portion of said read only memory.

* * * * *